(12) United States Patent
Vukovic

(10) Patent No.: US 11,081,910 B2
(45) Date of Patent: Aug. 3, 2021

(54) METHODS AND APPARATUS FOR WIRELESS POWER TRANSMISSION AND RECEPTION

(71) Applicant: AeroCharge Inc., San Diego, CA (US)

(72) Inventor: Marko Vukovic, San Diego, CA (US)

(73) Assignee: AeroCharge Inc., San Diego, CA (US)

( * ) Notice: Subject to any disclaimer, the term of this patent is extended or adjusted under 35 U.S.C. 154(b) by 22 days.

(21) Appl. No.: 16/833,223

(22) Filed: Mar. 27, 2020

(65) Prior Publication Data

US 2020/0313469 A1 Oct. 1, 2020

Related U.S. Application Data

(60) Provisional application No. 62/827,059, filed on Mar. 30, 2019.

(51) Int. Cl.
*H02J 50/80* (2016.01)
*H02J 50/40* (2016.01)
(Continued)

(52) U.S. Cl.
CPC .............. *H02J 50/80* (2016.02); *H02J 50/20* (2016.02); *H02J 50/40* (2016.02); *H02J 50/90* (2016.02); *H04W 4/80* (2018.02)

(58) Field of Classification Search
CPC .. H02J 50/10; H02J 50/12; H02J 50/23; H02J 50/27; H02J 50/15; H02J 50/50;
(Continued)

(56) References Cited

U.S. PATENT DOCUMENTS 3,989,994 A 11/1976 Brown
4,685,047 A 8/1987 Phillips, Sr.
(Continued)

OTHER PUBLICATIONS

Schaubert, Daniel, "Proceddings of the 2007 Antenna Applications Symposium, vol. 1-2", University of Massachusetts Amherst, Electronical and Computer Engineering, Sep. 18-20, 2007, 281 pgs.
(Continued)

*Primary Examiner* — John W Poos
(74) *Attorney, Agent, or Firm* — Jaquez Land Greenhaus & McFarland LLP; Martin J. Jaquez

(57) ABSTRACT

Methods and apparatus for wireless transmission and reception of power in a wireless power network are disclosed. The wireless power network comprises a wireless power transmitter configured to transmit RF power to at least one wireless power receiver. A method of transmitting power in a wireless power network is disclosed, wherein the wireless power network comprises a wireless power transmitter in bidirectional communication with at least one wireless power receiver. A wireless power transmitter capable of transmitting power to at least one wireless power receiver is also disclosed. In some embodiments, the wireless power transmitter comprises an application processor operably coupled to a plurality of wireless power transmitter channels. A wireless power receiver is also disclosed. The wireless power receiver may be configured to convert an RF power signal to direct current (DC).

20 Claims, 7 Drawing Sheets

(51) Int. Cl.
*H02J 50/90* (2016.01)
*H04W 4/80* (2018.01)
*H02J 50/20* (2016.01)

(58) Field of Classification Search
CPC .. H02J 50/60; H02J 50/70; H02J 50/80; H02J 50/90; H02J 50/20; H02J 50/40; H04B 5/0075; H04B 5/0037; H04B 5/031; H04B 5/0081; H04B 7/0617; H04B 1/40; H04W 52/0229; H04W 52/0245; H04W 52/0225; H04W 4/80
USPC ........................................................ 307/104
See application file for complete search history.

(56) References Cited

U.S. PATENT DOCUMENTS

| | | | |
|---|---|---|---|
| 4,965,602 A | 10/1990 | Kahrilas et al. | |
| 5,400,037 A | 3/1995 | East | |
| 5,764,187 A | 6/1998 | Rudish et al. | |
| 6,967,462 B1 | 11/2005 | Landis | |
| 7,068,991 B2 | 6/2006 | Parise | |
| 7,084,605 B2 | 8/2006 | Mickle et al. | |
| 8,072,380 B2 | 12/2011 | Crouch | |
| 8,180,286 B2 | 5/2012 | Yamasuge | |
| 8,447,234 B2 | 5/2013 | Cook et al. | |
| 8,879,995 B2 * | 11/2014 | Viglione | H02J 50/23 455/42 |
| 9,564,773 B2 | 2/2017 | Pogorelik et al. | |
| 9,620,996 B2 * | 4/2017 | Zeine | H02J 50/40 |
| 9,866,074 B2 * | 1/2018 | Zeine | H02J 50/40 |
| 9,893,768 B2 | 2/2018 | Leabman et al. | |
| 10,211,662 B2 | 2/2019 | Stein et al. | |
| 10,211,685 B2 | 2/2019 | Bell et al. | |
| 10,224,758 B2 | 3/2019 | Leabman et al. | |
| 10,284,019 B2 | 5/2019 | Shearer et al. | |
| 2008/0075033 A1 | 3/2008 | Shattil | |
| 2010/0244576 A1 | 9/2010 | Hillan et al. | |
| 2011/0127845 A1 * | 6/2011 | Walley | H02J 7/00034 307/104 |
| 2016/0014722 A1 | 1/2016 | Yoon et al. | |
| 2016/0087486 A1 | 3/2016 | Pogorelik et al. | |

OTHER PUBLICATIONS

Thomas, Shane, International Search Report and Written Opinion received from the USRO dated Jul. 29, 2020 for appln. No. PCT/US2020/025505, 16 pgs.

* cited by examiner

METHODS AND APPARATUS FOR WIRELESS POWER TRANSMISSION AND RECEPTION

CROSS-REFERENCE TO RELATED APPLICATIONS—CLAIM OF PRIORITY

The present application claims priority to U.S. provisional Patent Application No. 62/827,059, filed on Mar. 30, 2019, entitled "Method and system for wireless charging of electronic devices", which is herein incorporated by reference in its entirety.

BACKGROUND

(1) Technical Field

The present invention relates to wireless power transmission and reception. More specifically, the present invention relates to methods and apparatus for wirelessly transmitting and receiving power in wireless power networks.

(2) Background

Many wireless electronic devices, including cell phones, tablets, smart phones, smart watches, personal computers, wireless headphones, security sensors, and medical sensors, for example, require power charging in order to function properly. Many of these wireless electronic devices have internal batteries that are charged and re-charged in order to perform the functions provided by the electronic devices. Whether the electronic devices include internal battery power or are powered by external power sources, eventually the power sources must be charged or re-charged to ensure operability of the devices. Wireless charging of large numbers of electronic devices at the same time is important for home security, home automation, personal computing, connectivity, and health monitoring functions, to name a few applications. Continuous wireless charging increases usage of the devices, enables new sensing applications, and eliminates the inconvenience associated with required wired charging and re-charging. Finally, by removing charging ports associated with wired charging solutions, wireless charging solutions lead to improved device reliability and eliminate the need for device specific chargers.

One attractive strategy for addressing these needs is to utilize long range, high efficiency, and low-cost wireless charging systems implemented using phased array antenna transmitters and rectenna receivers. Phased array antennas allow for dynamic beam steering and focusing to enable efficient power transfer at any location within allowed coverage areas while Radio Frequency (RF) transmission makes long range wireless charging possible. Standardized and modular charger phased array antenna architectures may be used across different applications with power requirements ranging from milliwatts to kilowatts without significantly changing the system designs. This leads to greater commercial opportunities and fast adaption for different market segments.

Current charging efforts are focused on inductive coupling which has demonstrated good charging performance but has not addressed the issue of charging cords, freedom of placement and charging of a large number of devices at the same time. Other charging efforts have demonstrated long-range power delivery using retroactive RF systems, infrared and optical systems, and ultrasound arrays. However, the prior art wireless charging solutions suffer from low efficiency performance due to a lack of efficient transmitters, power converters and power loss due to the surrounding charging environment. The presently disclosed methods and apparatus for wireless power transmission and reception provides improvements over the prior art wireless power transmission and reception solutions.

SUMMARY

The disclosed methods and apparatus encompass a number of circuits and methods for wireless transmission and reception of power in a wireless power network. The wireless power network comprises a wireless power transmitter configured to transmit RF power to at least one wireless power receiver. The wireless power network further comprises a bidirectional wireless communication link between the wireless power transmitter and the wireless power receivers. In some embodiments, the wireless power transmitter comprises a phased array antenna configured to generate one or more transmit beams with dynamic control of the transmit beam direction, the RF power signal level, the beam width and the transmit time slot for each of the transmit beams.

A method of transmitting power in a wireless power network is disclosed, wherein the wireless power network comprises a wireless power transmitter in bidirectional communication with at least one wireless power receiver. In one embodiment, the method includes: discovering presence of a selected wireless power receiver to effectively transmit power to the selected wireless power receiver, establishing bidirectional communication between the wireless power transmitter and the selected wireless power receiver, determining a preferred path for the wireless power transmitter to use when transmitting power with at least one transmit beam to the selected wireless power receiver, determining if the selected wireless power receiver is within sufficient range of the wireless power transmitter to allow effective charging thereof, and transmitting power to the selected wireless power receiver sufficient to charge the selected receiver to a desired charging level. The method also includes monitoring a DC charging level of the selected receiver to determine if the charging level falls within acceptable charging limits.

A wireless power transmitter capable of transmitting power to at least one wireless power receiver is also disclosed. In some embodiments, the wireless power transmitter comprises an application processor operably coupled to a plurality of wireless power transmitter channels. In some embodiments, the application processor may comprise: a Wireless Personal Area Network (WPAN) module, a path selection algorithm, a beamforming algorithm, a power balancing algorithm, calibration tables, and a communication interface driver. In some embodiments, each wireless power transmitter channel comprises a channel processor, operably coupled to an RF frontend, which is operably coupled to an antenna. In some embodiments, the antenna comprises a polarizer operably coupled to an aperture. The aperture is configured to transmit RF power signals to a selected wireless power receiver.

Lastly, a wireless power receiver is disclosed. The wireless power receiver may be configured to convert an RF power signal to direct current (DC). In some embodiments, the wireless power receiver comprises: at least one wireless power receiver channel, a DC combining network operably coupled to the wireless power receiver channels, a DC sensing circuit operably coupled to the combining network, an output DC supply operably coupled to the sensing circuit, and a RF microcontroller IC operably coupled to the DC sensing circuit. In some embodiments, the wireless power receiver channel comprises an aperture, a polarizer operably coupled to the aperture, and an RF-DC power converter operably coupled to the polarizer.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
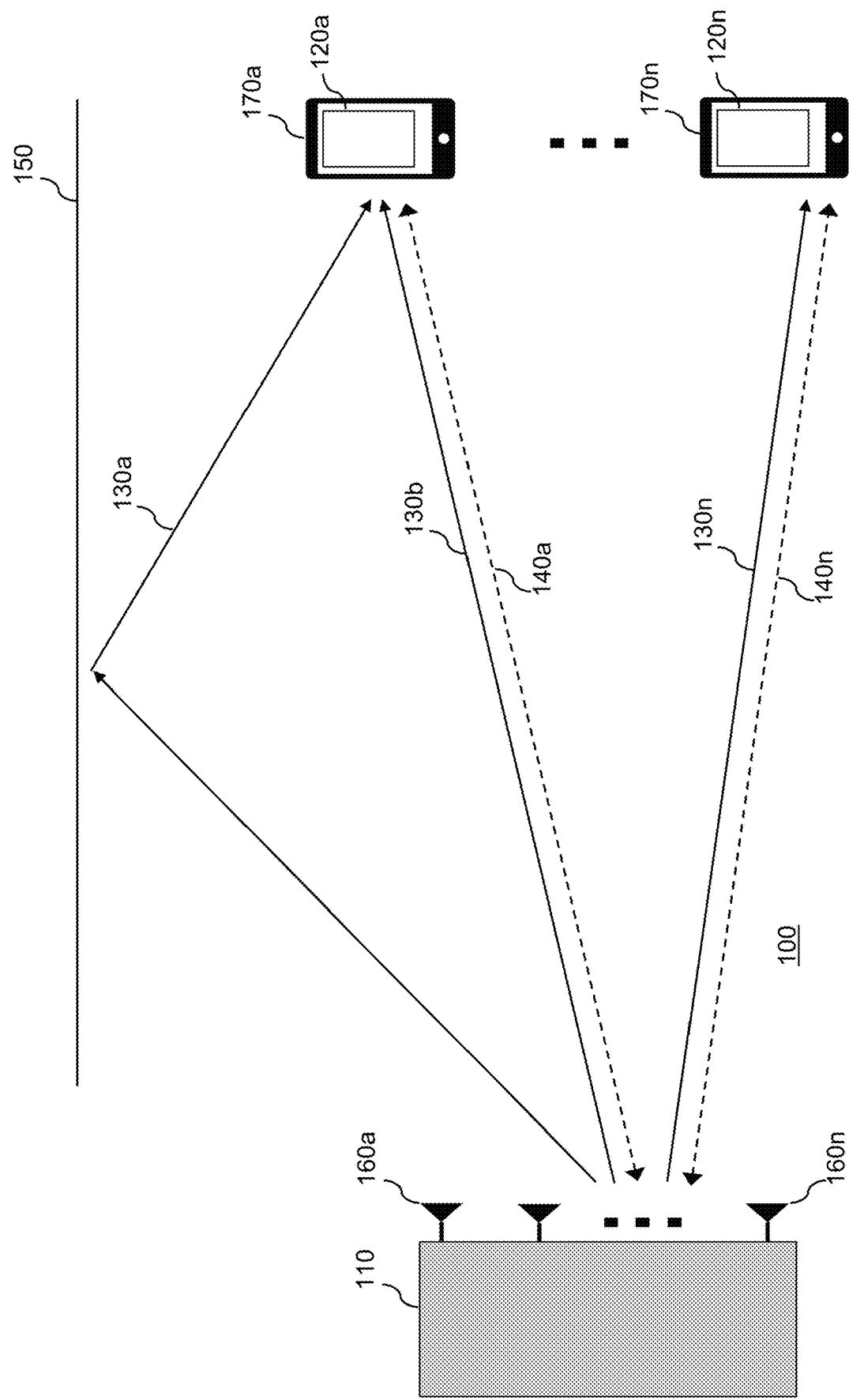
FIG. 1 is a block diagram of a wireless power network according to one embodiment of the present methods and apparatus.

While the present invention is susceptible of embodiment in many different forms, there is shown in the drawings and will herein be described in detail one or more specific embodiments, with the understanding that the present disclosure is to be considered as exemplary of the principles of the invention and not intended to limit the scope of the invention to the specific embodiments shown and described.

FIG. 1 is a drawing of a wireless power network 100 according to one embodiment of the present methods and apparatus. The wireless power network 100 comprises a wireless power transmitter 110 configured to transmit RF power to one or more wireless power receivers 120a-120n, wherein each wireless power receiver 120a-120n is coupled to respective client devices 170a-170n. The wireless power network 100 further comprises a bidirectional wireless communication link 140a-140n between the wireless power transmitter 110 and the wireless power receivers 120a-120n. The wireless power receivers 120a-120n may be operably coupled to their respective and associated client devices 170a-170n externally or built into the client device 170a-170n enclosures. The client devices 170a-170n may comprise any battery powered device such as a smart phone, a smart watch, a tablet, a personal computer, wireless headphones, security sensors, medical sensors as well as other battery powered devices that would be known to a person of ordinary skill in the wireless device arts.

In some embodiments, the wireless power transmitter 110 comprises a phased array antenna configured to generate one or more transmit beams with dynamic control of the transmit beam direction, the RF power signal level, the beam width and the transmit time slot for each of the transmit beams. The dynamic control of the transmit beam direction allows for directing of energy over one or more transmit paths 130a-130n to one or more wireless power receivers, 120a-120n, respectively. The transmit paths 130a-130n between the wireless power transmitter 110 and the wireless power receivers 120a-120n, respectively, may include line of sight transmit paths or a reflection from objects 150 such as a ceiling, walls, a floor or similar reflection objects. Dynamic control of the beam direction, the RF power signal level and the beam width is achieved with dynamic adjustments of a digital signal amplitude and phase for each of the wireless power transmitter channels 160a-160n. The wireless power receivers 120a-120n may be configured to convert the received RF power signals to Direct Current (DC) power signals, measure a received DC voltage and a DC current, and deliver the DC power signals to the client device 170a-170n batteries.

In some embodiments, the bidirectional wireless communication link 140a-140n may be configured for pairing, discovering, authenticating, communicating and synchronizing of the wireless power transmitter 110 with the wireless power receivers 120a-120n. In some embodiments, the bidirectional wireless communication link 140a-140n may be configured using one of the following wireless communication protocols: WiFi direct, Bluetooth, MiWi, ZigBee, Zwave as well as other protocols that are known persons of ordinary skill in the wireless communication arts.

Figure 2A:
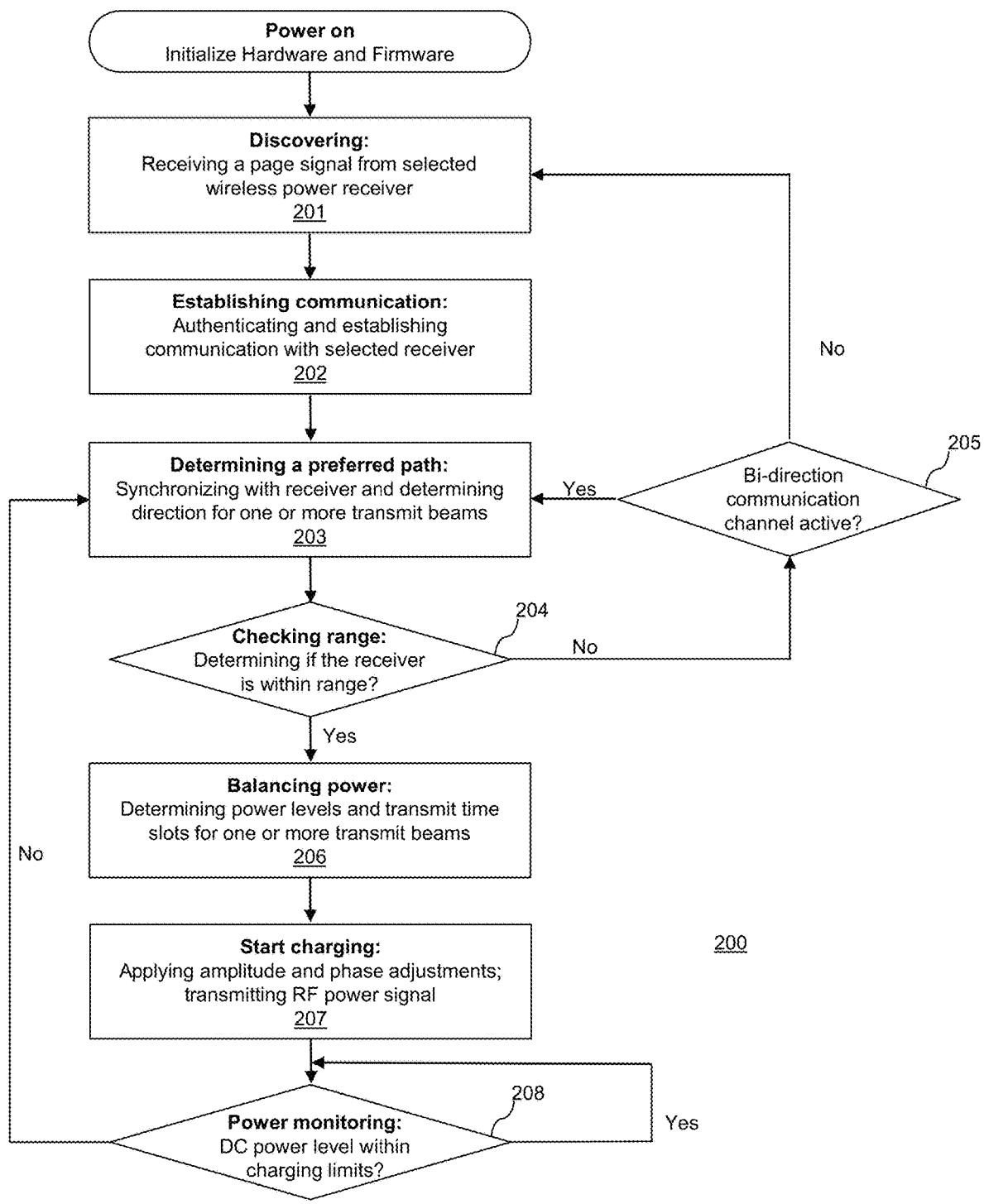
FIG. 2A is a flow diagram of a method of transmitting power in a wireless power network according to one embodiment of the present methods and apparatus.
Figure 2B:
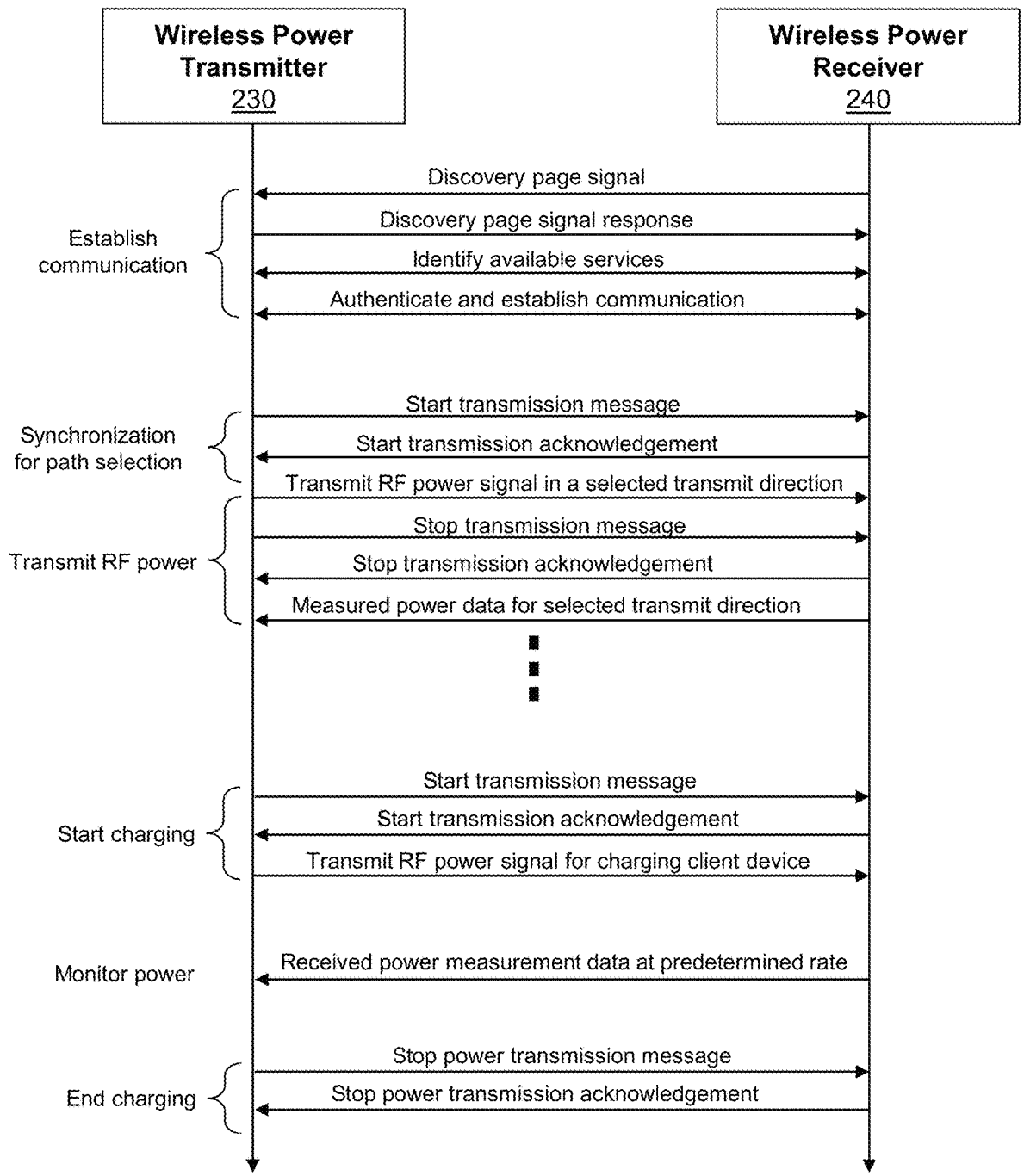
FIG. 2B shows an exemplary sequence diagram illustrating operations between a wireless power transmitter and a wireless power receiver according to one embodiment of the present methods and apparatus.

FIG. 2A is a flow diagram of a method of transmitting power 200 in a wireless power network according to one embodiment of the present methods and apparatus. FIG. 2B shows an exemplary sequence diagram illustrating operations between a wireless power transmitter 230 and a wireless power receiver 240 according to one embodiment of the present methods and apparatus. In some embodiments, the wireless power network 100 (see FIG. 1) comprises the wireless power transmitter 110 in bidirectional communication with at least one wireless power receiver (e.g., the wireless power receiver 120a of FIG. 1). In some embodiments, the method of transmitting power 200 in a wireless power network begins with a discovering step 201 as shown in FIG. 2A, wherein the discovering step 201 may include detecting presence of a selected wireless power receiver (such as, for example, the wireless power receiver 120a of FIG. 1) to allow the wireless power transmitter to effectively transmit power to the selected wireless power receiver. Referring simultaneously to both FIGS. 2A and 2B, in some embodiments, the discovering step 201 may start with the wireless power receiver 240 sending a page signal to the wireless power transmitter 230, which the wireless power transmitter 230 responds to in order to determine available services and parameters for connecting to those services. For example, if the bidirectional wireless communication link is configured using the Bluetooth protocol, the discovering step 201 may be configured using the Service Discovery Protocol (SDP) within the Bluetooth software. In some embodiments, the wireless power transmitter may, in a step 202, authenticate and establish communication with the wireless power receiver which may include several security steps enabled by the chosen communication protocol. For example, if the bidirectional wireless communication link is configured using the Bluetooth protocol, authenticating and establishing communication in the step 202 may be handled using the Link Management Protocol (LMP) and transfer of data may be handled using Object Exchange Protocol (OBEX). The discovering step 201 and the establishing communication step 202 (wherein authenticating and establishing communication with the one or more wireless power receivers is performed) may vary from protocol to protocol.

As shown in FIG. 2A, after establishing communication with a selected wireless receiver is performed in the step 202, the method 200 proceeds to a determining a preferred path step 203. In some embodiments, the determining a preferred path step 203 is performed in order to determine a direction of at least one transmit beam transmitted by the wireless power transmitter to a selected wireless power receiver. In some embodiments, the preferred path comprises a wireless power transmission path having the lowest path loss between the wireless power transmitter and the selected wireless power receiver. In some embodiments, determining the transmit direction for the at least one transmit beam may comprise performing a transmit scan with one or more scan patterns and selecting a transmit direction that results in the lowest path loss between the wireless power transmitter and the selected wireless power receiver wherein each scan pattern includes a set of predetermined transmit directions. The number of transmit directions and the spacing between the transmit directions in the scan pattern is determined based on the selected transmit beam width and the intended transmitter field of view. In some embodiments, a single scan pattern may be chosen to cover the full transmitter field of view, which would result in using a transmit beam with the highest possible focus and having the narrowest spacing between the transmit directions. In other embodiments, a layered scan pattern approach may be chosen comprising of an initial scan pattern with a large beam width and broadly spaced transmit directions followed by subsequent scan patterns with narrower transmit beams and transmit directions spacings centered around each of the transmit directions of the previous scan pattern. Only one subsequent scan pattern is chosen based upon the transmit direction that resulted in the lowest path loss in the previous scan pattern. This process is repeated until a transmit scan is performed for each scan layer. This type of layered scan pattern approach allows for a much lower number of transmit directions to be applied in the determining a preferred transmit path step 203.

In some embodiments, performing a transmit scan for the transmitter field of view may comprise the wireless power transmitter 230 synchronizing with the wireless power receiver 240 transmitting a low power signal, performing a transmit scan with predetermined transmit direction scan patterns and adjusting the beam width based on the resolution of the respective scan pattern. For example, synchronization may be performed by the wireless power transmitter 230 sending a start transmission message to the wireless power receiver 240 and starting transmission after receiving an acknowledgement message (see FIG. 2B). Switching to low power mode may be defined as 20 dB below maximum power signal level. The number of scan directions, the spacing between scan directions and the beam width are degrees of freedom used to create a predetermined scan pattern which covers the intended field of view. In some embodiments, the transmit scan is designed with an appropriate number of scan patterns to scan the full wireless transmitter field of view while minimizing the number of scan directions required. Each scan direction may be represented with spherical coordinates theta and phi. Adjusting the beam width may include turning on an appropriate number of wireless power transmitter channels in the center of the antenna aperture. Turning on a fewer number of channels leads to a wider beam width while turning on a larger number of channels leads to a more focused beam.

As shown in FIG. 2A, after determining a preferred path in the step 203, the method 200 proceeds to a determining range step 204. At the determining range step 204, the method 200 determines if one or more wireless receivers are within range of the wireless power transmitter for effective charging thereof. In some embodiments, determining if one or more wireless power receivers are within charging range (step 204) may comprise computing the path loss between the wireless power transmitter and a respective wireless power receiver and comparing it to a minimum path loss threshold. Computing path loss may comprise subtracting received DC power from the transmitted RF power level. If the computed path loss is lower than the minimum threshold the wireless power receiver is determined to be out of range. If the receiver is determined to be out of range, the method 200 proceeds to a decision step 205 wherein a check is performed to determine if the bidirectional wireless communication link is active. If the bidirectional wireless communication link is not active, the method 200 returns to the discovering step 201. If the bidirectional wireless communication link is active, the method 200 proceeds to the determining the preferred path step 203 for a selected wireless power receiver. If the wireless receiver is within charging range, the method 200 proceeds to the step 206 wherein power balancing is performed.

In some embodiments, the balancing power step 206 may comprise determining power levels and time slots for one or more transmit directions based on available transmit power, number of client devices, type of client device and path loss. After the balancing power step 206 is complete, the method 200 proceeds to a start charging step 207. In some embodiments, charging is started by applying amplitude and phase adjustments to the wireless power transmitter channels. The method 200 then proceeds to a power monitoring step 208. During power monitoring step 208, the selected wireless power receiver computes the received DC power based on the measured DC voltage and DC current and sends the calculated data to the wireless power transmitter which compares the received DC power to a minimum power threshold. If the power level drops below the minimum threshold, the method 200 returns to the determining a preferred path step 203 for the selected wireless power receiver, else the method 200 continues to monitor the received DC power levels to ensure that they are within charging limits.

Figure 3A:
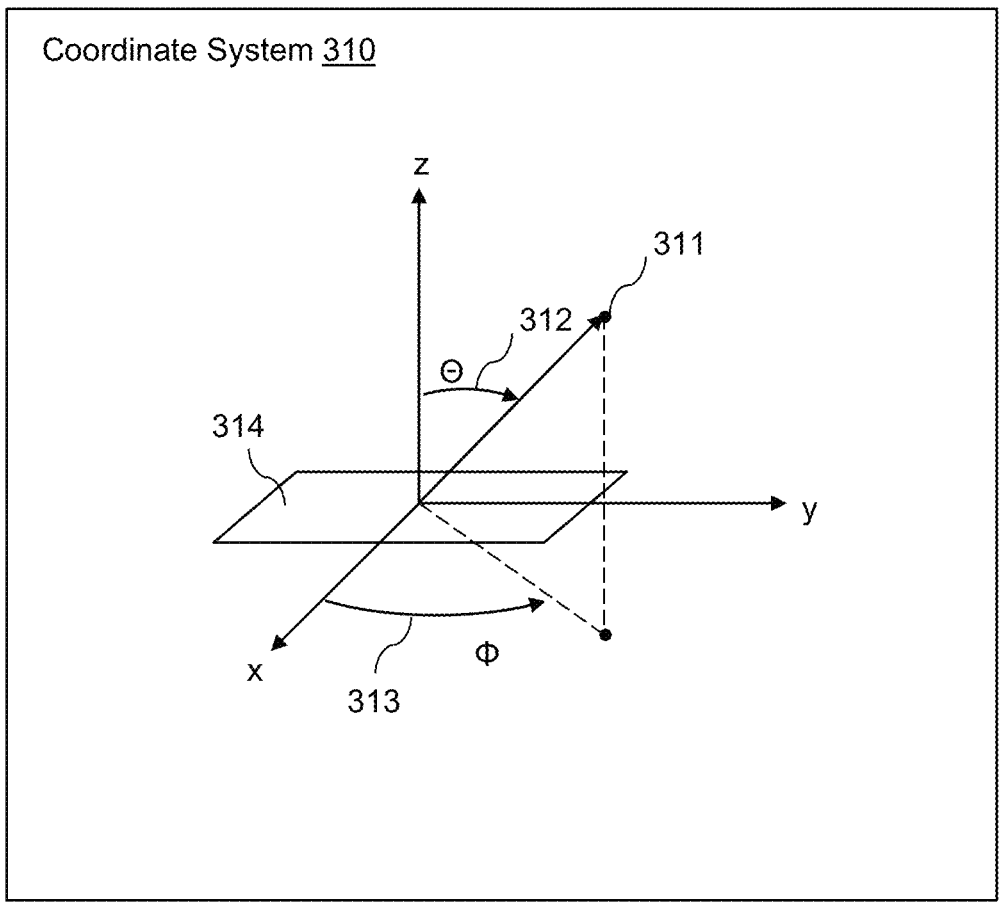
FIG. 3A shows a drawing of cartesian and spherical coordinate systems according to one embodiment of the present methods and apparatus.

FIG. 3A is a drawing of cartesian and spherical coordinate system 310 according to one embodiment of the present disclosure. A wireless power transmitter antenna aperture 314 may be positioned in the x-y plane. Theta 312 and phi 313 are spherical coordinates that define the transmit beam direction 311. Theta 312 and phi 313 are inputs to the beamforming algorithm for generating the wireless power transmitter channel phase adjustments for transmitting the RF power signal in a corresponding transmit direction 311.

Figure 3B:
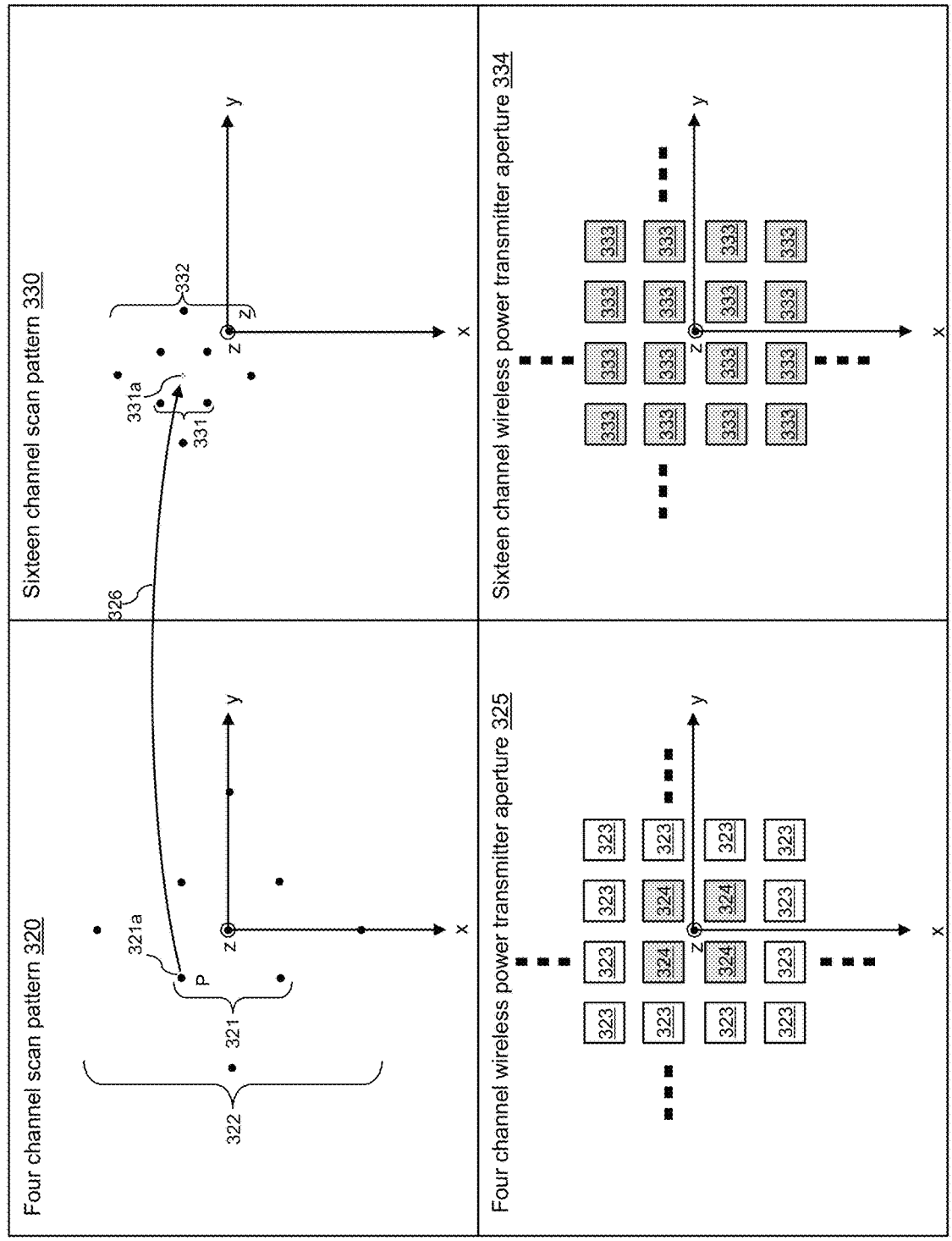
FIG. 3B is a drawing of an exemplary transmit scan comprising two subsequent scan patterns according to one embodiment of the present methods and apparatus.

FIG. 3B is a drawing of a transmit scan example comprising two subsequent scan patterns. For example, in some embodiments, a wireless power transmitter with a field of view of 40 degrees in theta and 360 degrees in phi, may include an initial four channel scan pattern 320 by turning on four center wireless power transmitter channels 324. This generates a transmit beam with approximately 40 degree 3 dB beam width. The remaining wireless power transmitter channels 323 are turned off and are not transmitting a signal. Using an approximate 40 degree 3 dB beam width, an initial transmit scan may be designed with eight scan directions configured with two constellations of four directions each. The inner constellation directions 321 may be positioned at theta equal to 20 degrees with a 90 degree separation in phi between directions, and the outer constellation directions 322 may be positioned at theta equal to 40 degrees with a 90 degree separation in phi between directions. The inner and outer constellations are offset by 45 degrees in phi. In this example, if the wireless power transmitter field of view was greater than 40 degrees in theta additional outer constellations may be added to achieve desired scan coverage. After scanning all eight directions in the constellation, a single direction 321a that resulted in lowest path loss between the wireless power transmitter and the selected wireless power receiver is identified and selected.

The selected direction 321a in the initial scan pattern maps over 326 to the subsequent scan pattern as the local origin 331a. The following scan pattern may be selected to be a sixteen channel scan pattern 330 by turning on sixteen center channels 333 in the wireless power transmitter aperture 334 which generates a transmit antenna pattern with approximately 20 degree 3 dB beam width. Because the 3 dB beam width of the 16 channel wireless power transmitter aperture 334 is half of the 3 dB beam width of the 4 channel wireless power transmitter aperture 325, the same constellation configuration may be used for the sixteen channel scan pattern 330 as for the four channel scan pattern 320 with constellation centered at the local origin 331a. The inner constellation directions 331 may be positioned at theta equal to 10 degrees referenced to the local origin 331a and outer constellation directions 332 may be positioned at theta equal 20 degrees referenced to the local origin 331a with the outer constellation rotated by 45 degrees in phi referenced to the local origin 331a. After scanning all eight directions in the constellation, a single direction that resulted in the lowest path loss between the wireless power transmitter and the selected wireless power receiver is identified and selected. This process may be repeated for subsequent scan patterns if needed until a direction has been identified using maximum beam focus.

Figure 4:
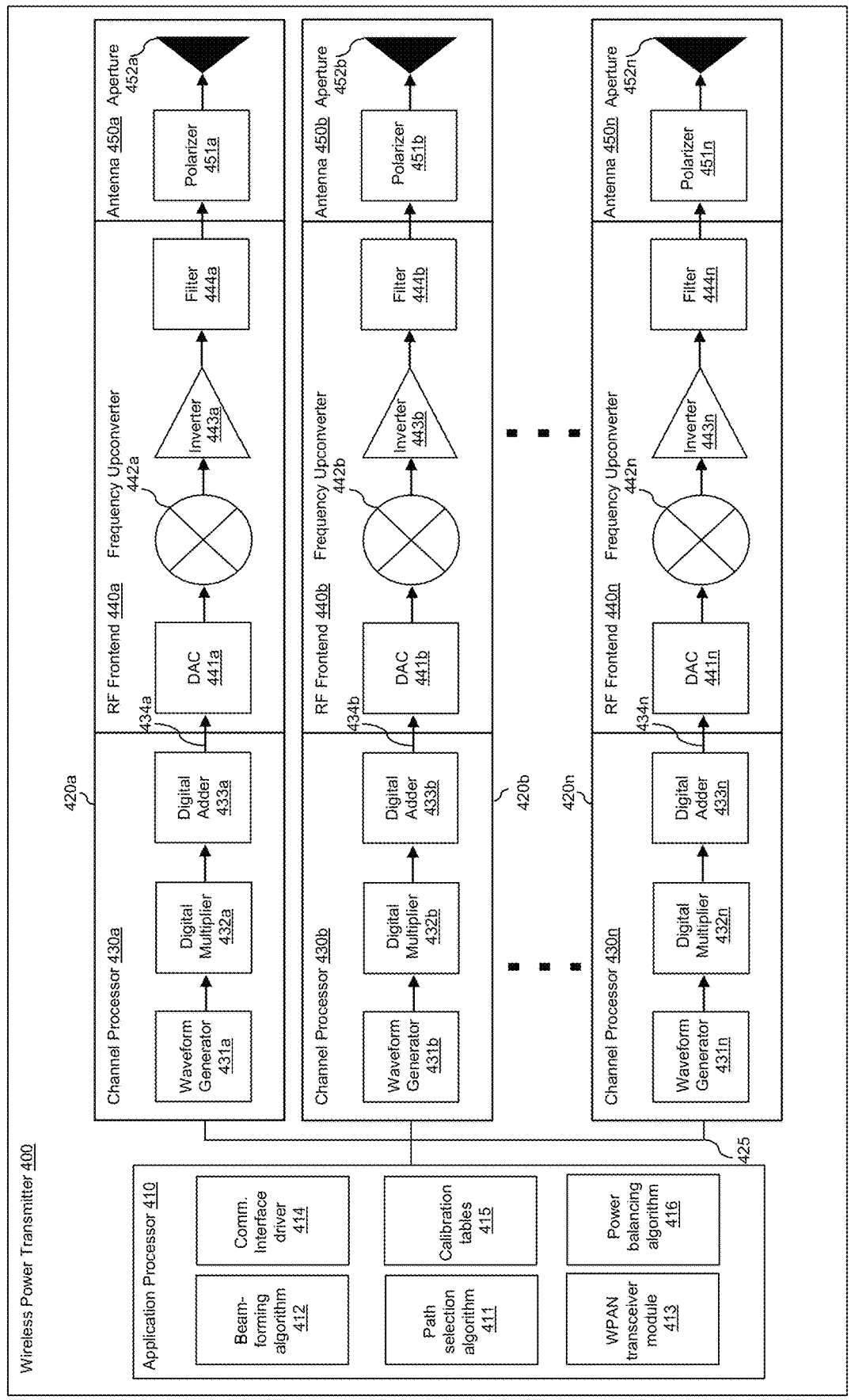
FIG. 4 shows a block diagram of a wireless power transmitter according to one embodiment of the present methods and apparatus.

FIG. 4 is a block diagram of a wireless power transmitter 400 according to one embodiment of the present disclosure. As shown in FIG. 4, the wireless power transmitter 400 comprises an application processor 410 and a plurality of wireless power transmitter channels 420a-420n operably connected to the application processor 410.

In some embodiments, the application processor 410 may comprise: a Wireless Personal Area Network (WPAN) module 413, a path selection algorithm 411, a beamforming algorithm 412, a power balancing algorithm 416, calibration tables 415, and a communication interface driver 414. In some embodiments, the application processor 410 may comprise an RF microcontroller integrated circuit (IC) which may be configured with a WPAN transceiver physical layer based on the selected wireless protocol.

In some embodiments, the WPAN module 413 comprises a WPAN software stack and a WPAN transceiver physical layer. In some embodiments, the WPAN module 413 may be configured to wirelessly discover, authenticate, and communicate with a wireless power receiver. In some embodiments, the WPAN module 413 may include the path selection algorithm 411, the power balancing algorithm 416 and the beamforming algorithm 412 at the WPAN module 413 software application layer. In other embodiments, the WPAN module 413 may be configured with a wireless protocol such as WiFi, Bluetooth, MiWi, ZigBee, Zwave as well as other protocols that would be known to a person of ordinary skill in the wireless communication arts.

In some embodiments, the path selection algorithm 411 may be operably connected to the WPAN module 413 for receiving measured power data from a selected wireless power receiver. The path selection algorithm 411 may be configured to determine the transmit direction for one or more transmit beams. In some embodiments, the power balancing algorithm 416 may be operably connected to the path selection algorithm 411 and configured to determine amplitude adjustments and time slots for one or more transmit beams based on available transmit power, number of client devices, type of client devices, path loss and calibration data 415. The beamforming algorithm 412 may be configured to compute phase adjustment for each of the wireless power transmitter channels 420a-420n and a digital waveform based on spherical coordinate theta and phi input from the path selection algorithm 411 and the calibration data 415. In some embodiments, computing the phase adjustments may be based on exciting an electromagnetic planewave with a uniform phase front in the desired transmit direction where theta represents the tilt of the beam from the boresight of the antenna and phi represents the beam rotation. For example, in some embodiments, implementing the beamforming algorithm 412 may be performed with a look up table for each transmit beam direction stored in memory of the application processor 410. The output from the beamforming algorithm 412 are the phase adjustments for each of the wireless power transmitter channels 420a-420n which are sent to their associated and respective channel processors 430a-430n via the communication interface driver 414. In other embodiments, the beamforming algorithm 412 may be implemented in each channel processor 430a-430n instead of by the application processor 410. This embodiment allows phase adjustment calculations for each of the wireless power transmitter channels 420a-420n to occur in parallel, reducing the processing time and latency when changing transmit directions.

The calibration tables 415 comprise calibration phase and amplitude coefficients across temperature for each of the wireless power transmitter channels 420a-420n. The calibration tables 415 may be stored in memory of the application processor 410 and may be combined with channel amplitude and phase adjustments prior to being sent to the channel processors 430a-430n.

In some embodiments, the plurality of wireless power transmitter channels 420a-420n may be operably connected to the application processor 410 by a digital communication interface 425 which may be configured as a Serial Peripheral Interface (SPI), Inter-Integrated Circuit (I$^2$C), Universal Serial Bus (USB), as well as other digital communication interfaces that are known to a person of ordinary skill in the digital communication arts. Each of the wireless power transmitter channels 420a-420n may comprise a channel processor (such as the channel processor 430a), an RF frontend (such as the RF frontend 440a) and an antenna (such as the antenna 450a). In some embodiments, a single wireless power transmitter channel, such as, for example, the wireless power transmitter channel 420a, may be implemented in an RF Application Specific Integrated Circuit (ASIC). In such embodiments, the ASIC implementation of the wireless power transmitter channel would not include the antenna (such as, for example, the antenna 450a). In other embodiments, one or more of the channel processors 430a-430n may comprise a single Field Programmable Gate Array (FPGA) operably coupled to a respective Digital-to-Analog Converters (DAC) (such as, for example, the DAC 441a). In some embodiments, the channel processors 430a-430n each may comprise a digital waveform generator (such as, for example, the digital waveform generator 431*a*), a digital multiplier (such as, for example, the digital waveform multiplier 432*a*) and a digital adder (such as, for example, the digital adder 433*a*).

In some embodiments, the digital waveform generator (e.g., 431*a*) may be configured to generate one digital waveform per transmit beam with each waveform having a defined phase relationship to a channel processor (e.g., 430*a*) clock based on the phase adjustment required to set the transmit direction for one or more transmit beams. For example, in some embodiments the digital waveform generator (e.g., 431*a*) may be implemented using a lookup table (LUT) with one period of a sinusoidal wave represented by M samples, wherein M is determined based on a required phase adjustment resolution. A period for the sinusoidal wave is determined based on a selected baseband or intermediate frequency. Each sample in the waveform may be represented by N bits, wherein N is an integer of one or more, selected to represent M distinct sample values. In some embodiments, the waveform generator (e.g., 431*a*) receives the required phase adjustment from the beamforming algorithm 412 which it uses to select the corresponding amplitude value in the LUT as its first sample in the waveform. This allows for waveforms across the different wireless power transmitter channels 420*a*-420*n* to have the required phase difference between them for generating a beam in the desired transmit direction. In other embodiments, implementing the waveform generator (e.g., 431*a*) may be performed by generating an oversampled 1-bit digital waveform with M samples per period of the selected baseband frequency. The phase adjustments may be performed by delaying the waveform by the required number of samples in the digital domain.

In some embodiments, the digital multiplier (e.g., 432*a*) may be configured to receive a complex number input from the application processor 410 representing amplitude and phase adjustment for the respective wireless power transmitter channel 420*a*-420*n*, perform multiplication between the received complex number and the generated digital waveform, and take the real part of the result. The amplitude adjustment may be used for amplitude calibration of each wireless power transmitter channel 420*a*-420*n* and to set the power level for the respective transmit beam. Phase adjustment may be used as an alternative way to adjust waveform phase. The digital adder (e.g., 433*a*) may be configured to superimpose two or more waveforms for a single wireless power transmitter channel 420*a*-420*n* when more than one transmit beam is generated.

In some embodiments, the RF frontends 440*a*-440*n* are operably connected to their associated and corresponding channel processors 430*a*-430*n* with associated and corresponding serial or a parallel interfaces 434*a*-434*n*. In some embodiments, each RF frontend (e.g., 440*a*) comprises: a Digital-to-Analog Converter (DAC) (e.g., 441*a*), a frequency upconverter (e.g., 442*a*) operably connected to the DAC (e.g., 441*a*), an RF inverter (e.g., 443*a*) operably connected to the frequency upconverter (e.g., 442*a*), and a band select filter (e.g., 444*a*) operably connected to the RF inverter (e.g., 443*a*).

The DAC (e.g., 441*a*) is configured to convert a digital waveform to an analog waveform. The required number of bits for the DAC (e.g., 441*a*) are based on the dynamic range for the wireless power transmitter 400 and the minimum required phase adjustment for the waveform. For example, in some embodiments the DAC (e.g., 441*a*) may be configured as an 8-bit DAC leading to 48 dB of dynamic range and approximately 0.7 degrees of phase resolution if phase adjustments are performed using the digital waveform generator (e.g., 431*a*). In other embodiments, the DAC (e.g., 441*a*) may be configured as a low pass filter or bandpass filter and convert a digital signal to analog signal by filtering higher order harmonics. For example, if the output signal from the channel processor (e.g., 430*a*) is a 1 MHz digital signal then the DAC (e.g., 441*a*) may be configured as a bandpass filter centered at 1 MHz with enough rejection at 2 MHz and above, for example 20 dB or more, to filter higher order harmonics and generate a sinusoidal waveform at 1 MHz at the output.

The frequency upconverter (e.g., 442*a*) is configured to convert a baseband or intermediate frequency (IF) signal to an RF signal and filter spurious frequency tones. In some embodiments, the frequency upconverter (e.g., 442*a*) may comprise a direct conversion mixer or IQ mixer which has good single sideband rejection performance. In other embodiments, the frequency upconverter (e.g., 442*a*) may be configured as a Phased Lock Loop (PLL) wherein a PLL may be used in a wireless power transmitter implementation where amplitude adjustments are not required which includes wireless power transmitters with only one beam and low channel to channel amplitude variation. For example, in some embodiments the intermediate frequency may be 1 MHz, with local oscillator frequency at 5.799 GHz and output RF frequency at 5.8 GHz.

The RF inverter (e.g., 443*a*) is configured to convert an input DC signal to an RF signal and set the power level for the transmitted signal. The RF inverter (e.g., 443*a*) may comprise a linear amplifier or a switch mode inverter which leads to higher efficiency for operation with a single beam. The band select filter (e.g., 444*a*) may be configured as a bandpass filter to reject unwanted frequency tones and ensure compliance with RF emission specifications for the selected band.

The antenna (e.g., 450*a*) is operably coupled to its associated and respective RF frontend (e.g., 440*a*). In some embodiments, the antenna (e.g., 450*a*) comprises: a polarizer 451*a* which may be configured to set the polarization for the radiated electromagnetic field and perform impedance matching, and an aperture 452*a* operably coupled to the polarizer 451*a*. In some embodiments, the polarizer 451*a* may be configured as a feed network with two microstrip lines feeding the square microstrip aperture on two adjacent sides with one of the microstrip lines physically longer to provide additional 90 degrees of phase shift and excite a circularly polarized wave. The aperture 452*a* is operably connected to the polarizer 451*a*, wherein the aperture 452*a* is configured to transmit the RF power signal. In some embodiments, the aperture 452*a* may be a square microstrip aperture with circular polarization which provides good performance and allows for easy integration with the rest of the wireless power transmitter 400 on a single Printed Circuit Board (PCB). In other embodiments, the aperture 452*a* may comprise other microstrip aperture configurations to achieve similar functionality such as circular patch, stacked patch as well as other apertures that would be known to a person of ordinary skill in the antenna art. The aperture to aperture maximum spacing (such as, for example, the spacing between the aperture 452*a* and the aperture 452*b*), may, in some embodiments, be configured as half a wavelength to one wavelength determined by the maximum scan angle at the operating frequency. Setting the aperture to aperture separation above the maximum separation will introduce large grating lobes in the transmitted antenna pattern. In some embodiments, the antennas and the RF frontends may be configured to operate in Industrial, Scientific and Medical (ISM) unlicensed bands including frequency range of 2.4 GHz to 2.5 GHz, 5.725 GHz to 5.875 GHz, 24 GHz to 24.25 GHz, or 61 GHz to 61.5 GHz.

Figure 5:
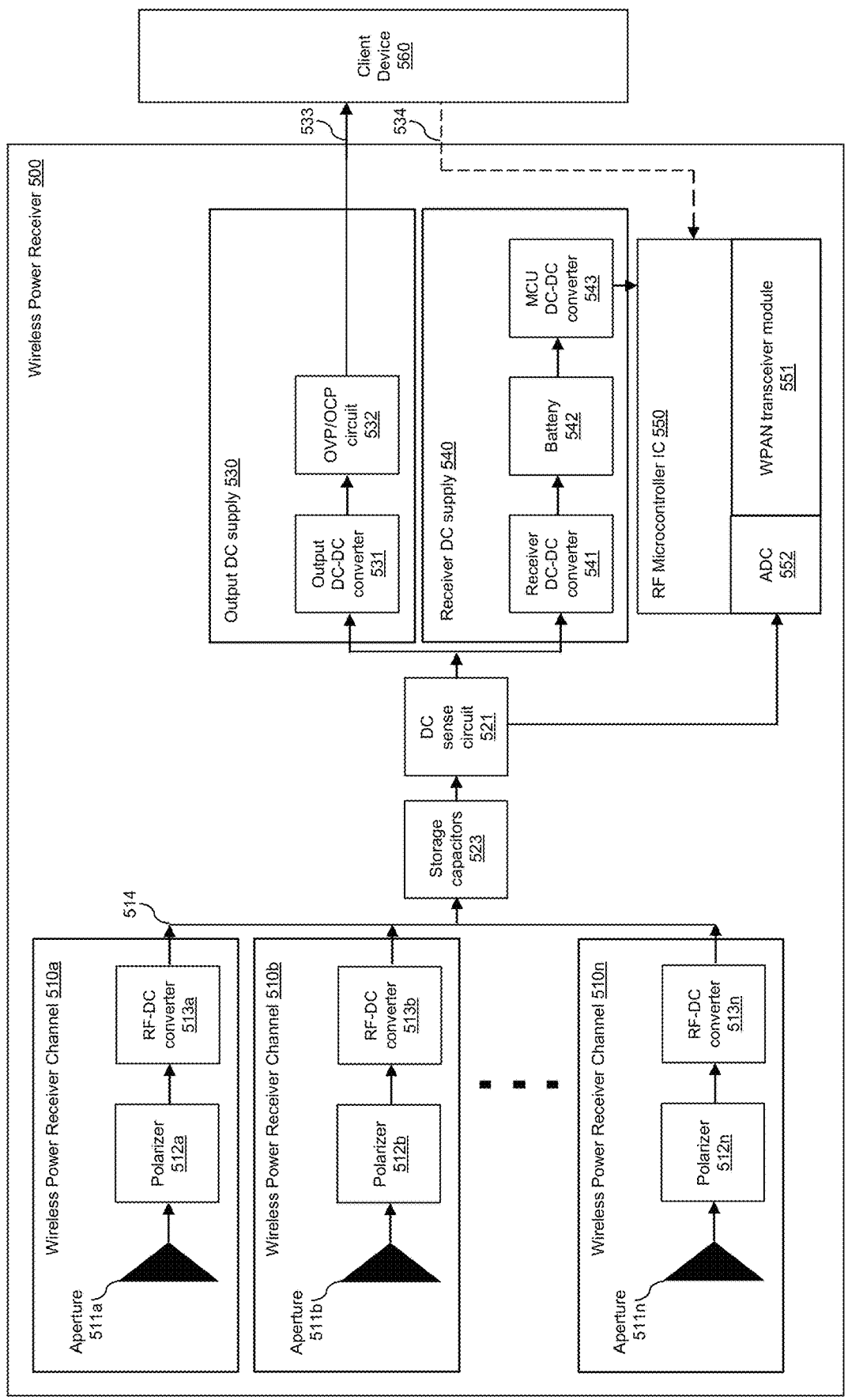
FIG. 5 shows a block diagram of a wireless power receiver according to one embodiment of the present methods and apparatus.

FIG. 5 is a block diagram of a wireless power receiver 500 according to one embodiment of the present disclosure. In some embodiments, the wireless power receiver 500 may be configured to convert an RF power signal to direct current (DC) and charge a client device battery. As shown in FIG. 5, in some embodiments, the wireless power receiver 500 comprises: at least one wireless power receiver channel 510a-510n, a DC combining network 514 operably coupled to the output of the wireless power receiver channels 510a-510n, storage capacitors 523, operably coupled to the output of the DC combining network 514, a DC sensing circuit 521 operably coupled to the storage capacitors 523, an output DC supply 530 operably coupled to the sensing circuit 521, and a receiver DC supply 540 operably coupled to the sensing circuit 521.

In some embodiments, each of the wireless power receiver channels 510a-510n may comprise an aperture (e.g., 511a), a polarizer (e.g., 512a) operably connected to the aperture 511a, and an RF-to-DC power converter (RDC) (e.g., 513a) operably connected to the polarizer 512a. In some embodiments, the aperture 511a is configured to receive the RF power signal wherein the aperture 511a may comprise a square microstrip aperture with circular polarization which achieves good performance and allows for easy integration with the rest of the wireless power receiver 500 on a single Printed Circuit Board (PCB). In other embodiments, the apertures 511a-511n may comprise other microstrip antenna configurations to achieve similar functionality such as circular patch antenna, stacked patch antenna as well as other apertures that would be known to a person of ordinary skill in the art. The wireless power receiver channels 510a-510n may be configured to operate in frequency ranges of 2.4 GHz to 2.5 GHz, 5.725 GHz to 5.875 GHz, 24 GHz to 24.25 GHz, or 61 GHz to 61.5 GHz, which are Industrial, Scientific and Medical (ISM) unlicensed bands. In some embodiments, the polarizers 512a-512n may be configured to set the polarization for the radiated electromagnetic field and perform impedance matching. The polarizers (e.g., 512) may be configured as a feed network with two microstrip lines feeding the square microstrip aperture on two adjacent sides with one of the microstrip lines physically longer to provide additional 90 degrees of phase and receive a circularly polarized wave. The RDCs (e.g., 513a) are configured to convert the RF power signal to a DC power signal. Various RDC designs were evaluated, with one or more stage voltage multiplier providing the best tradeoff between circuit complexity, cost and performance. A single stage voltage multiplier is a full wave rectifier capable of achieving high conversion efficiency. High frequency RF to DC conversion may require impedance matching to improve efficiency by reducing the reflected signal due to off-state diode capacitance.

In some embodiments, the DC output signals from all of the wireless power receiver channels 510a-510n are connected in parallel at a single node 514 to combine the output power. If the power density received by the wireless power receiver 500 is constant across the receiver apertures 511a-511n, and if the RDCs 513a-513n are well matched, the combining power loss should be minimal. This combining approach allows the wireless power receiver 500 to achieve a wide field of view limited only by the performance of the antenna apertures 511a-511n. For the square microstrip aperture the expected 3 dB field of view is about 70 degrees. In other embodiments, combining the received power transmitted by the wireless power transmitter may be implemented using a transmission line power combiner, as well as using other types of RF combiners that are well known to persons of ordinary skill in the electronic design arts. Such RF combiners may, in some embodiments, be coupled to the output of the individual polarizers (such as the polarizers 512a, 512b, etc.). The wireless power receiver field of view for the alternate approach may be further enhanced by adding phase shifters to each of the wireless power receiver channels 510a-510n prior to the RF combiner to constructively phase align signals from different directions.

In some embodiments, the storage capacitors 523 are operably coupled to the output of the DC combine network 514 and configured to provide energy storage to ensure continued charging of a client device 560 during short charging interruptions. In some embodiments, the sensing circuit 521 is operably coupled to the storage capacitors 523 and configured to measure DC voltage and current. The output DC supply 530 and the receiver DC supply 540 may be operably coupled to the sensing circuit 521. In some embodiments, the output DC supply 530 comprises: an output DC-DC converter 531 configured to produce and maintain voltage required by the client device 560 and an OVP/OCP circuit 532 configured to protect the client device's battery from over voltage and over current events. In some embodiments, the receiver DC supply 540 comprises: a receiver DC-DC converter 541 configured to convert the input voltage to voltage required for charging a receiver battery 542, the receiver battery 542 operably connected to the receiver DC-DC converter 541, and an MCU DC-DC converter 543 operably connected to the receiver battery 542. The MCU DC-DC converter 543 is configured to convert receiver battery 542 voltage to voltage required by the RF microcontroller IC 550. In other embodiments, the receiver DC supply 540 may not be required if the RF microcontroller IC receives DC power 534 from the client device 560 or from some other power source.

In some embodiments, a RF microcontroller IC 550 may be operably coupled to the MCU DC-DC converter 543. The RF microcontroller IC 550 comprises: a Wireless Personal Area Network (WPAN) module 551 configured to wirelessly communicate with the wireless power transmitter, and an Analog to Digital Converter (ADC) 552 operably coupled to the sensing circuit 521. The ADC 552 is configured to convert DC voltage output by the sensing circuit 521 into digital samples which are converted by the RF microcontroller IC to a power number and reported to the wireless power transmitter at a predetermined period during path selection and power transfer. The RF microcontroller IC 550 may be configured with WiFi direct, Bluetooth, Zigbee, Zwave, and MiWi, as well as with other protocols that are known to persons of ordinary skill in the wireless communication arts.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain method steps and certain apparatus components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the description provided.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method of transmitting power in a wireless power network, wherein the wireless power network comprises a wireless power transmitter in bidirectional communication with at least one wireless power receiver, including:
   (a) discovering presence of a selected wireless power receiver that is in communication with the wireless power transmitter to allow the wireless power transmitter to effectively transmit power to the selected receiver;
   (b) establishing bidirectional communication between the wireless power transmitter and the selected wireless power receiver;
   (c) determining a preferred path for the wireless power transmitter to use when transmitting power with at least one transmit beam to the selected wireless power receiver, wherein the preferred path comprises a wireless power transmission path having the lowest path loss between the wireless power transmitter and the selected receiver, and wherein the preferred path determines a transmit direction for the transmit beams when transmitting power to the selected receiver;
   (d) determining if the selected wireless power receiver is within sufficient range of the wireless power transmitter to allow effective charging of the selected receiver, and if the selected receiver is not within a range that is sufficient for effective charging thereof, proceeding to discovering presence of a next selected wireless power receiver else proceeding with transmitting power to the selected receiver;
   (e) transmitting power to the selected receiver sufficient to charge the selected receiver to a desired charging level; and
   (f) monitoring a DC charging level of the selected receiver to determine if the charging level falls within acceptable charging limits, and if the charging level falls below a minimum threshold, returning to determining a preferred path, else continuing to monitor the DC charging level until the wireless powerless receiver is charged to a desired charging level.

2. The method of transmitting power of claim 1, wherein the determining the preferred path further includes:
   (a) performing a transmit scan using at least one scan pattern that ensures full coverage of a transmitter field of view wherein the scan pattern comprises a predetermined set of transmit beam directions;
   (b) selecting the transmit beam direction having the lowest path loss between the wireless power transmitter and the selected receiver; and
   (c) introducing layered scan patterns thereby reducing a required number of transmit directions in selecting the transmit beam direction having the lowest path loss.

3. The method of transmitting power of claim 2, further comprising: balancing power by determining power levels and time slots for the transmit beam directions based on available transmit power, a number of client devices, types of client devices, and path loss.

4. The method of transmitting power of claim 1, wherein the bidirectional communication established between the wireless power transmitter and the selected receiver is implemented by a wireless link comprising one of the following: WiFi direct; Bluetooth; MiWi; ZigBee; and Zwave.

5. A wireless power transmitter transmitting power to at least one wireless power receiver in a wireless power network, wherein the wireless power transmitter is in bidirectional communication with the wireless power receivers, comprising:
   (a) a plurality of wireless power transmitter channels, wherein each wireless power transmitter channel comprises: a channel processor, an RF frontend operably coupled to the channel processor, and an antenna, operably coupled to the RF frontend and capable of transmitting power to the wireless power receivers; and
   (b) an application processor, coupled to the plurality of wireless power transmitter channels, containing and configured to process algorithms for use with the wireless power transmitter, comprising:
      (1) a Wireless Personal Area Network (WPAN) module, configured to wirelessly discover, authenticate and communicate with a selected wireless power receiver;
      (2) a power balancing algorithm, configured to determine amplitude adjustments and time slots for at least one transmit beam based on available transmit power, a number of client devices, types of client devices, path loss and calibration data;
      (3) a path selection algorithm, configured to determine transmit beam directions for the transmit beams and beam widths transmitted by the transmitter; and
      (4) a beamforming algorithm, configured to compute phase adjustment for each power transmitter channel and digital waveform based on the transmit beam directions provided by the path selection algorithm and calibration data.

6. The wireless power transmitter of claim 5, wherein the channel processor is operably coupled to the application processor, and wherein the channel processor further comprises:
   (a) a digital waveform generator, wherein the waveform generator is configured to generate one digital waveform per transmit beam with each digital waveform having a predetermined phase relationship to a channel processor clock;

(b) a digital multiplier, coupled to an output of the digital waveform generator, the digital multiplier configured to receive a complex number from the application processor wherein the complex number represents amplitude and phase adjustment for its respective wireless power transmitter channel, and wherein the digital multiplier performs multiplication using the complex number and upon the digital waveform generated by the waveform generator, and wherein the digital multiplier uses a real part of the resulting multiplication; and (c) a digital adder, coupled to the digital multiplier, wherein the digital adder is configured to superimpose two or more waveforms for a single wireless power transmitter channel when more than one transmit beam is transmitted.

7. The wireless power transmitter of claim 5, wherein the RF frontend comprises:

(a) a digital-to-analog (DAC) operably coupled to an output of the channel processor, configured to convert a digital waveform to an analog waveform;

(b) a frequency upconverter, operably coupled to the DAC; wherein the frequency upconverter is configured to convert a baseband or intermediate frequency (IF) signal to an RF signal; and (c) an RF inverter operably coupled to the frequency upconverter, configured to amplify and set a power level for an RF transmitted signal output by the wireless power transmitter.

8. The wireless power transmitter of claim 7, wherein the frequency upconverter comprises a direct conversion quadrature mixer which has good single sideband performance.

9. The wireless power transmitter of claim 7, wherein the RF inverter comprises a switch mode amplifier.

10. The wireless power transmitter of claim 5, wherein the antenna comprises:

(a) a polarizer, wherein the polarizer is configured to set the polarization for a radiated electromagnetic field and perform impedance matching; and (b) an aperture, operably coupled to the polarizer, wherein the aperture is configured to transmit an RF power signal.

11. The wireless power transmitter of claim 10, wherein the aperture comprises one of the following: a microstrip planar aperture; a square microstrip patch aperture with circular polarization; a circular patch aperture, and a stacked patch aperture.

12. The wireless power transmitter of claim 5, wherein the wireless power transmitter is implemented on a single printed circuit board.

13. The wireless power transmitter of claim 6, wherein the digital waveform generator is configured to generate an N-bit waveform, wherein N is an integer equal to one or an integer greater than one.

14. The wireless power transmitter of claim 7, wherein the DAC comprises a low pass filter or a bandpass filter configured to convert a digital signal to an analog signal by filtering higher order harmonics.

15. The wireless power transmitter of claim 5, wherein the application processor comprises a radio frequency microcontroller integrated circuit.

16. The wireless power transmitter of claim 6, wherein the channel processors are implemented in either a single Field-Programmable Gate Array (FPGA) device or an Application Specific Integrated Circuit (ASIC) device.

17. The wireless power transmitter of claim 5, wherein the beamforming algorithm is implemented by the channel processor.

18. A wireless power receiver receiving RF power from a wireless power transmitter, wherein the receiver is in bidirectional communication with the transmitter, comprising:

(a) at least one wireless power receiver channel configured to convert RF power signals transmitted by the wireless power transmitter into direct current (DC), the wireless power receiver channel comprising:

(1) an aperture configured to receive the RF power signals transmitted by the wireless power transmitter;

(2) a polarizer operably coupled to the aperture; and (3) an RF/DC power converter;

(b) a DC combine network coupled to the RF/DC power converters;

(c) a DC sense circuit coupled to the DC combine network, wherein the DC sense circuit is configured to measure DC current and DC voltage;

(d) an Output DC supply, comprising an Output DC-DC converter, configured to produce and maintain voltage required by a client device that is coupled to the wireless power receiver; and (e) an RF microcontroller, operably coupled to the DC sense circuit, wherein the RF microcontroller comprises an analog-to-digital converter (ADC) device, operably coupled to the DC sense circuit, and a Wireless Personal Area Network (WPAN) module; and wherein the ADC is configured to convert DC voltage received from the DC sense circuit into digital samples, and wherein the RF microcontroller converts the digital samples to a power number and reports the power number to the wireless power transmitter at a predetermined period during path selection and power transfer.

19. The wireless power receiver of claim 18, wherein the aperture comprises one of the following: a microstrip planar aperture; a square microstrip patch aperture with integrated matching and a circular polarization network; a circular patch aperture; and a stacked patch aperture.

20. The wireless power receiver of claim 18, wherein the wireless power receiver channels further comprise:

(4) a phase shifter, operably coupled to the polarizer, wherein the phase shifter is configured to phase align the RF power signals for all wireless power receiver channels.

* * * * *